United States Patent
Park et al.

(10) Patent No.: US 12,467,745 B2
(45) Date of Patent: Nov. 11, 2025

(54) ANAMORPHIC DEPTH GAUGE FOR OPHTHALMIC SYSTEMS

(71) Applicant: Alcon Inc., Fribourg (CH)

(72) Inventors: John Park, Irvine, CA (US); Edward A. DeHoog, Long Beach, CA (US)

(73) Assignee: Alcon Inc., Fribourg (CH)

( * ) Notice: Subject to any disclaimer, the term of this patent is extended or adjusted under 35 U.S.C. 154(b) by 438 days.

(21) Appl. No.: 18/055,732

(22) Filed: Nov. 15, 2022

(65) Prior Publication Data
US 2023/0160690 A1 May 25, 2023

Related U.S. Application Data

(60) Provisional application No. 63/281,524, filed on Nov. 19, 2021, provisional application No. 63/281,528, filed on Nov. 19, 2021.

(51) Int. Cl.
*G01B 11/22* (2006.01)
*A61B 90/00* (2016.01)

(52) U.S. Cl.
CPC .............. *G01B 11/22* (2013.01); *A61B 90/06* (2016.02); *A61B 2090/062* (2016.02)

(58) Field of Classification Search
CPC ... G01B 11/22; A61B 90/06; A61B 2090/061; A61B 2090/062; A61B 2090/367;
(Continued)

(56) References Cited
U.S. PATENT DOCUMENTS

| | | |
|---|---|---|
| 3,780,979 A | 12/1973 | De |
| 4,357,088 A | 11/1982 | Pomerantzeff |

(Continued)

FOREIGN PATENT DOCUMENTS

| | | |
|---|---|---|
| AU | 2018274939 B2 | 6/2020 |
| CN | 210009227 U | 2/2020 |

(Continued)

OTHER PUBLICATIONS

Blake F. Webb, et al.; "Prevalence of vitreous floaters in a community sample of smartphone users"; Internat'l Journal of Ophthalmology; Jun. 18, 2013; pp. 402-405; 6(3); PMC/ US National Library of Medicine National Institutes of Health.
(Continued)

*Primary Examiner* — Bumsuk Won
*Assistant Examiner* — Seth D Moser
(74) *Attorney, Agent, or Firm* — Patterson + Sheridan, LLP

(57) ABSTRACT

In certain embodiments, an ophthalmic system includes an anamorphic depth gauge (ADG) device and a computer. The ADG device measures the z-location in the interior of an eye and includes a detector array arranged at an oblique angle with respect to the z-axis. The array generates a detector signal in response to detecting a light beam, which has a z-focus in the interior of the eye. A set of line focus optical elements focuses the light beam to form a line focus on the detector array, and a set of nominal focus optical elements focuses the light beam to form a nominal focus on the detector array. The computer: generates an image using the detector signal; determines the position of the nominal focus on the line focus according to the image; and determines the z-location of the z-focus from the position of the nominal focus on the line focus.

21 Claims, 4 Drawing Sheets

(58) Field of Classification Search
CPC .............. A61B 3/1025; A61B 3/13; A61F
2009/00861; A61F 2009/00874; A61F
2009/00897; A61F 9/008; A61F 9/007;
A61F 9/00821
USPC .......................... 351/206; 606/4, 6, 13, 204
See application file for complete search history.

(56) References Cited

U.S. PATENT DOCUMENTS

| | | | |
|---|---|---|---|
| 5,312,396 A | 5/1994 | Feld | |
| 5,909,270 A | 6/1999 | Moser | |
| 6,142,630 A | 11/2000 | Koester | |
| 6,322,556 B1 | 11/2001 | Gwon | |
| 6,789,900 B2 | 9/2004 | Van De Velde | |
| 7,374,287 B2 | 5/2008 | Van De Velde | |
| 7,510,282 B2 | 3/2009 | Ueno | |
| 7,520,613 B2 | 4/2009 | Saito et al. | |
| 7,703,922 B2 * | 4/2010 | Van de Velde | A61B 3/1025 |
| | | | 351/221 |
| 8,480,659 B2 | 7/2013 | Frey et al. | |
| 8,652,602 B1 | 2/2014 | Dolla | |
| 8,783,868 B2 | 7/2014 | Qiu | |
| 8,876,808 B2 | 11/2014 | Feklistov et al. | |
| 8,994,753 B2 | 3/2015 | Nakano | |
| 9,033,500 B2 | 5/2015 | Utsunomiya | |
| 9,603,519 B2 | 3/2017 | Bor et al. | |
| 9,675,243 B2 | 6/2017 | Sasak et al. | |
| 9,789,002 B2 | 10/2017 | Van De Velde | |
| 10,130,511 B2 | 11/2018 | Dantus | |
| 10,478,342 B2 | 11/2019 | Dick | |
| 10,555,835 B2 | 2/2020 | Schuele et al. | |
| 11,356,594 B1 * | 6/2022 | Bruguier | G02B 21/361 |
| 2007/0258094 A1 | 11/2007 | Izatt et al. | |
| 2007/0291277 A1 | 12/2007 | Everett | |
| 2009/0073384 A1 | 3/2009 | Warden | |
| 2009/0137989 A1 | 5/2009 | Kataoka | |
| 2009/0196477 A1 | 8/2009 | Cense et al. | |
| 2010/0123873 A1 | 5/2010 | Raymond | |
| 2010/0152847 A1 | 6/2010 | Padrick | |
| 2011/0077557 A1 | 3/2011 | Wing et al. | |
| 2012/0281235 A1 | 11/2012 | Murata | |
| 2013/0131652 A1 | 5/2013 | Dick | |
| 2013/0173029 A1 | 7/2013 | Caldeira et al. | |
| 2014/0058367 A1 | 2/2014 | Dantus | |
| 2014/0216468 A1 | 8/2014 | Goldshleger | |
| 2014/0257257 A1 | 9/2014 | Grant et al. | |
| 2014/0268036 A1 | 9/2014 | Ketterling et al. | |
| 2014/0276674 A1 | 9/2014 | Lee | |
| 2015/0190278 A1 | 7/2015 | Gooding | |
| 2015/0342782 A1 | 12/2015 | Mordaunt | |
| 2016/0058617 A1 | 3/2016 | Luttrull et al. | |
| 2016/0074214 A1 * | 3/2016 | Palanker | A61B 18/20 |
| | | | 606/6 |
| 2016/0074221 A1 | 3/2016 | Tassignon et al. | |
| 2016/0166431 A1 | 6/2016 | Vogler et al. | |
| 2016/0227999 A1 | 8/2016 | An et al. | |
| 2016/0235588 A1 | 8/2016 | Hart et al. | |
| 2016/0256324 A1 | 9/2016 | Suzuki | |
| 2016/0278629 A1 * | 9/2016 | Schuele | A61B 3/1225 |
| 2016/0302969 A1 | 10/2016 | Yamamoto | |
| 2017/0181625 A1 | 6/2017 | Kawakami et al. | |
| 2017/0252213 A1 | 9/2017 | Furuuchi et al. | |
| 2017/0326003 A1 | 11/2017 | Schuele et al. | |
| 2018/0028354 A1 | 2/2018 | Heeren | |
| 2018/0028355 A1 | 2/2018 | Raksi | |
| 2018/0140257 A1 | 5/2018 | Govindjee et al. | |
| 2018/0206719 A1 | 7/2018 | Adler et al. | |
| 2018/0317767 A1 | 11/2018 | Ryan | |
| 2018/0353064 A1 | 12/2018 | Soetikno et al. | |
| 2018/0368915 A1 | 12/2018 | Xia et al. | |
| 2019/0159933 A1 | 5/2019 | Romano et al. | |
| 2019/0282403 A1 | 9/2019 | Barrett et al. | |
| 2019/0290124 A1 | 9/2019 | Laforest et al. | |
| 2019/0313903 A1 | 10/2019 | Mckinnon | |
| 2019/0365569 A1 | 12/2019 | Skovgaard et al. | |
| 2020/0038241 A1 * | 2/2020 | Wang | A61F 9/009 |
| 2020/0060873 A1 | 2/2020 | Heeren | |
| 2020/0085292 A1 | 3/2020 | Fukuma et al. | |
| 2020/0129336 A1 | 4/2020 | Schuele et al. | |
| 2020/0130103 A1 | 4/2020 | Choi | |
| 2020/0192080 A1 | 6/2020 | Karam | |
| 2020/0196853 A1 | 6/2020 | Van Hemert et al. | |
| 2020/0273218 A1 | 8/2020 | Camino et al. | |
| 2020/0397289 A1 | 12/2020 | Ralston | |
| 2020/0400422 A1 | 12/2020 | Ralston | |
| 2021/0100450 A1 | 4/2021 | Amma | |
| 2021/0186753 A1 | 6/2021 | Al-Qaisi et al. | |
| 2021/0275009 A1 | 9/2021 | Yates | |
| 2021/0378507 A1 | 12/2021 | Wallace | |
| 2021/0386586 A1 * | 12/2021 | Bor | G02B 26/101 |
| 2022/0012459 A1 | 1/2022 | Schwiegerling | |
| 2022/0031511 A1 | 2/2022 | Charles | |
| 2023/0123150 A1 * | 4/2023 | Burge | G01B 9/02 |
| | | | 356/512 |
| 2023/0157889 A1 | 5/2023 | Bor | |

FOREIGN PATENT DOCUMENTS

| | | |
|---|---|---|
| CN | 108371542 B | 4/2020 |
| CN | 109196333 B | 12/2020 |
| CN | 111281651 B | 12/2020 |
| CN | 112462782 A | 5/2021 |
| CN | 112587302 B | 6/2021 |
| CN | 112587304 B | 6/2021 |
| DE | 19705044 A1 | 8/1998 |
| DE | 102019007147 A1 | 4/2021 |
| DE | 102019007148 A1 | 4/2021 |
| EP | 0770370 A2 | 2/1997 |
| EP | 1212022 B1 | 3/2005 |
| EP | 1563785 A1 | 8/2005 |
| EP | 1638452 B1 | 10/2006 |
| EP | 1838212 A1 | 10/2007 |
| EP | 2144552 A1 | 1/2010 |
| EP | 1928297 B1 | 11/2010 |
| EP | 2459138 A2 | 6/2012 |
| EP | 2525706 A2 | 11/2012 |
| EP | 2898820 A1 | 7/2015 |
| EP | 3061429 A1 | 8/2016 |
| EP | 2890340 B1 | 2/2017 |
| EP | 3459487 A1 | 3/2019 |
| EP | 3501463 A1 | 6/2019 |
| EP | 3636137 A1 | 4/2020 |
| EP | 3861924 A1 | 8/2021 |
| GB | 2469249 A | 10/2010 |
| JP | 5767014 B2 | 6/2015 |
| JP | 2017176558 A | 10/2017 |
| JP | 6410468 B2 | 10/2018 |
| JP | 2018196821 A | 12/2018 |
| JP | 2018196822 A | 12/2018 |
| JP | 2020022569 A | 2/2020 |
| JP | 6736304 B2 | 7/2020 |
| JP | 6839902 B2 | 2/2021 |
| RU | 2661016 C1 | 7/2018 |
| RU | 2692666 C1 | 6/2019 |
| RU | 2695629 C1 | 7/2019 |
| RU | 2710058 C2 | 12/2019 |
| RU | 2726468 C1 | 7/2020 |
| WO | 9958047 A1 | 11/1999 |
| WO | 0137769 A1 | 5/2001 |
| WO | 0195791 A1 | 12/2001 |
| WO | 2007059189 A2 | 5/2007 |
| WO | 2009033110 A2 | 3/2009 |
| WO | 2009036104 A2 | 3/2009 |
| WO | 2009039315 A2 | 3/2009 |
| WO | 2009059400 A1 | 5/2009 |
| WO | 2010117386 A1 | 10/2010 |
| WO | 2014053824 A1 | 4/2014 |
| WO | 2015131135 A1 | 9/2015 |
| WO | 2015171793 A1 | 11/2015 |
| WO | 2016033590 A1 | 3/2016 |
| WO | 2017062673 A1 | 4/2017 |
| WO | 2017196306 A1 | 11/2017 |
| WO | 2017205857 A1 | 11/2017 |
| WO | 2020074532 A1 | 4/2020 |

(56) References Cited

FOREIGN PATENT DOCUMENTS

| | | |
|---|---|---|
| WO | 2020180729 A1 | 9/2020 |
| WO | 2020215359 A1 | 10/2020 |
| WO | 2020216763 A1 | 10/2020 |
| WO | 2020257711 A1 | 12/2020 |
| WO | 2021023799 A1 | 2/2021 |
| WO | 2021049243 A1 | 3/2021 |
| WO | 2021066047 A1 | 4/2021 |
| WO | 2021092211 A1 | 5/2021 |
| WO | 2021183637 A1 | 9/2021 |
| WO | 2022149028 A1 | 7/2022 |
| WO | 2023089416 A1 | 5/2023 |
| WO | 2023089459 A1 | 5/2023 |
| WO | 2023097391 A1 | 6/2023 |

OTHER PUBLICATIONS

Chirag P. Shah, et al., YAG Laser Vitreolysis vs Sham YAG Vitreolysis for Symptomatic Vitreous Floaters A Randomized Clinical Trial, JAMA Ophthalmology, Sep. 2017, 918-923, 135-9.

Ellex Website, Treatment Guidelines—Laser Floater Removal; 2016, Ellex Medical Pty Ltd. E&OE. VB0002E, downloaded Apr. 20, 2017.

Felix Sauvage et al: "Photoablation of Human Vitreous Opacities by Light—Induced Vapor Nanobubbles", ACS Nano, vol. 13, No. 7, Jul. 9, 2019, pp. 8401-8416.

Kim Jihwan et al. "Nonmechanical Laser Beam Steering Based on Polymer Polarization Gratings: Design Optimization and Demonstration",  Journal of Lightwave Technology, vol. 33, No. 10, pp. 2068-2077, May 15, 2015.

Michael J. Escuti, et al., "Geometric-Phase Holograms", Optics & Photonics News, pp. 22-29, Feb. 2016.

Milston Rebecca et al: "Vitreous floaters: Etiology, diagnostics, and management", Survey of Ophthalmology, vol. 61, No. 2, Mar. 1, 2016, pp. 211-227.

Nicusor Iftimia et al: "Hybrid retinal imaginer using line-scanning laser ophthalmoscopy and spectral domain optical coherence tomography", Optics Express, vol. 14, No. 26, Dec. 22, 2006.

Reece Bergstrom, et al., Vitreous Floaters, National Center for Biotechnology Information, May 21, 2020, 4 pages, Bookshelf ID NBK470420, StatPearls Publishing LLC, online.

Wikipedia Encyclopedia, Floater, Wikipedia Encyclopedia, Mar. 29, 2021, online: https://en.wikipedia.org/wiki/floater?wprov=sfti 1.

Zhang Yunbo et al: "Parallel large-range scanning confocal microscope based on a digital micromirror device", Optik vol. 124, No. 13 (2013), Aug. 4, 2012, pp. 1585-1588.

Adrian G.H. Podoleanu et al., Combined optical coherence tomograph and scanning laser ophthalmoscope mi nije dostupan besplatno., Electronics Letters, 34 (11), 1998.

Chi-Hung Lee, et al., Imaging vitreous floaters and cataracts with optical simulations, Optik, 194, 1-9, 2019.

Christy K. Sheehy et al., High-speed, image-based eye tracking with a scanning laser ophthalmoscope, Biomedical Optics Express, vol. 3, No. 10, 2012.

D. H. Kelly, "Retinal Inhomogeneity. II. Spatial Summation," J. Opt. Soc. Am., pp. 114-119, vol. 1, No. 1 (Jan. 1984).

D. H. Kelly, "Retinal Inhomogeneity. III. Circular-Retina Theory," D.H. Kelly, J. Opt. Soc. Am., pp. 810-819, vol. 2, No. 6 (Jun. 1985).

D.H. Kelly, "Visual Processing of Moving Stimuli," J. Opt. Soc. Am., pp. 216-225, vol. 2, No. 2 (Feb. 1985).

D.H. Kelly,, "Motion and Vision. II. Stabilized Spatio-Temporal Threshold Surface," J. Opt. Soc. Am., pp. 1340-1349, vol. 69, No. 10 (Oct. 1979).

D.H.Kelly, "Retinal Inhomogeneity. I. Spatiotemporal Contrast Sensitivity," J. Opt. Sec. Am., pp. 107-113, vol. 1, No. 1 (Jan. 1984).

Mojana F. et al.. Observations by spectral-domain optical coherence tomography combined with simultaneous scanning laser ophthalmoscopy: imaging of the vitreous, American Journal of Ophthalmol. Apr. 2010; 149(4):641-650.

Nidek, Scanning Laser Ophthalmoscope Mirante SLO/OCT Mirante SLO, https://www.nidek-intl.com/product/ophthaloptom/diagnostic/dia_retina/mirante.htm.

Peter G. J. Barten, "Contrast Sensitivity of the Human Eye and its Effects on Image Quality," Chapter 3, pp. 27-40, Model for the spatial contrast sensitivity of the eye, (1999).

Pointer, J. S., & Hess, R. F. "The contrast sensitivity gradient across the human visual field: With emphasis on the low spatial frequency range,", R. F. Vision Research, 29(9), 1133-1151 (1989).

Sebag J et al., Vitreous and Vitreoretinal Interface, Ch. 21, 2015.

Sebag J., Vitreous and Vision Degrading Myodesopsia. Progress in Retinal and Eye Research Nov. 2020;79.

T Ivanova et al, Vitrectomy for primary symptomatic vitreous opacities: an evidence-based review, Eye (Lond) May 2016;30(5):645-55.

Teri T Kleinberg et al., Vitreous substitutes: a comprehensive review, Survey of Ophthalmology, 56 (4), 2011.

Damodaran et al., "Digital micromirror device based ophthalmoscope with concentric circle scanning", 2017, pp. 2766-2780, vol. 8, No. 5, Biomedical Optics Express.

Fischer et al., "Scanning Laser Ophthalmoscopy (SLO)", In: Bille JF, editor. High Resolution Imaging in Microscopy and Ophthalmology: New Frontiers in Biomedical Optics [Internet], Aug. 14, 2019, accessed on Jan. 30, 2023 from https://www.ncbi.nlm.nih.gov/books/NBK554043, Springer.

Ginner et al., "Wide-Field OCT Angiography at 400 KHz Utilizing Spectral Splitting", Photonics, Oct. 23, 2014, pp. 369-379, vol. 1, No. 4.

Heidelberg Engineering GMBH, "Spectralis. Hardware Operating Instructions," Version 001, Aug. 2007.

Heidelberg Engineering, "Spectralis. Multimodal Imaging Platform Optimized for the Posterior Segment", accessed on Jan. 30, 2023 from https://business-lounge.heidelbergengineering.com/us/en/products/spectralis/spectralis/.

Hofer et al., "Dispersion encoded full range frequency domain optical coherence tomography", Jan. 5, 2009, pp. 7-24, vol. 17, No. 1, Optics Express, US.

Hofer et al., "Fast dispersion encoded full range optical coherence tomography for retinal imaging at 800 nm and 1060 nm", Mar. 1, 2010, pp. 4898-4919, vol. 18, No. 5, Optics Express.

Leitgeb et al., "Complex ambiguity-free Fourier domain optical coherence tomography through transverse scanning", 2007, pp. 3453-3455, vol. 32, Optics Letters.

Li et al., "DMD-based three-dimensional chromatic confocal microscopy", 2020, pp. 4349-4356, vol. 59, No. 14, Applied Optics.

Martial et al., "Programmable Illumination and High-Speed, Multi-Wavelength, Confocal Microscopy Using a Digital Micromirror", Aug. 2012, e43942, vol. 7, No. 8, PLOS ONE.

Reznicek Lukas et al., "Wide-Field Megahertz OCT Imaging of Patients with Diabetic Retinopathy", Journal of Diabetes Research, 2015, 5 pages.

Ruggeri et al., "Imaging and full-length biometry of the eye during accommodation using spectral domain OCT with an optical switch", Jul. 1, 2012, pp. 1506-1520, vol. 3, No. 7, Biomedical Optics Express.

Sarunic et al., "Instantaneous complex conjugate resolved spectral domain and swept-source OCT using 3x3 fiber couplers", Feb. 2005, pp. 957-967, vol. 13, No. 3, Optics Express.

Shields et al., "Wide-angle Imaging of the Ocular Fundus", Review of the Ophthalmology, Feb. 15, 2003.

Singh, "Lasers Take Aim at Floaters", Ophthalmology Management, Jul. 1, 2019, pp. 38, 40-42, 59, vol. 23.

Singh, "Modern vitreolysis—YAG laser treatment now a real solution for the treatment of symptomatic floaters", Survey of Ophthalmology, Mar. 3, 2020, pp. 581-591, vol. 65, No. 5.

SunLED, NanoPoint-0201 Series LEDs, published Feb. 15, 2016, www.SunLEDusa.com.

Volk Optical, "Volk Idrees Mid-Vitreous Lens", Dec. 20, 2020, accessed on Dec. 20, 2020 from https://www.volk.com/ . . . s?pr_prod_strat=collection_fallbackpr_rec_pid=4513049018402&pr_ref_pid=4513048952866pr_seq=uniform.

Volk Optical, "Volk Singh Mid-Vitreous Lens", Dec. 20, 2020, accessed on Dec. 20, 2020 from https://www.volk.com/products/

(56) References Cited

OTHER PUBLICATIONS singh-mid-vitreous-vitreous-slit-lamp-lens?_pos=3
&amp;amp;_ sid=b50c0674f&amp;amp;_ss=r.

Wang et al., "In vivo full range complex Fourier domain optical coherence tomography", Jan. 30, 2007, 054103, vol. 90, Applied Physics Letters.

Wojtkowski et al., "Full range complex spectral optical coherence tomography technique in eye imaging", 2002, pp. 1415-1417, vol. 27, No. 16, Optics Letters.

Yasuno et al., "Simultaneous B—M-mode scanning method for real-time full-range Fourier domain optical coherence tomography", 2006, pp. 1861-1865, vol. 45, No. 8, Applied Optics.

Zhang et al., Removal of a mirror image and enhancement of the signal-to-noise ratio in Fourier-domain optical coherence tomography using an electro-optic phase modulator, Jan. 15, 2005, vol. 30, No. 2, Optics Letters.

Zhou et al., "Dual channel dual focus optical coherence tomography for imaging accommodation of the eye", May 25, 2009, pp. 8947-8955, vol. 17, No. 11, Optics Express.

\* cited by examiner

ANAMORPHIC DEPTH GAUGE FOR OPHTHALMIC SYSTEMS

CROSS-REFERENCE TO RELATED APPLICATIONS

This application claims priority to and benefit of U.S. Provisional Patent Application No. 63/281,524, filed Nov. 19, 2021, and U.S. Provisional Patent Application No. 63/281,528, filed Nov. 19, 2021. The entire contents of each of which are incorporated by reference herein in their entirety.

TECHNICAL FIELD

The present disclosure relates generally to ophthalmic systems, and more particularly to an anamorphic depth gauge for ophthalmic systems.

BACKGROUND

Certain ophthalmic procedures involve aiming a laser beam towards a target in the interior of an eye. For example, laser vitreolysis treats eye floaters by directing a laser beam towards a floater to fragment the floater. Using lasers to treat the eye, however, requires clear imaging of the target as well as measuring the depth of the target within the eye. Known solutions, however, often fail to provide adequate imaging or depth measurement.

BRIEF SUMMARY

In certain embodiments, an ophthalmic system includes an anamorphic depth gauge (ADG) device and a computer. The ADG device measures the z-location in the interior of an eye, which has an eye axis that defines a z-axis. The ADG device includes a detector array, a set of line focus optical elements, and a set of nominal focus optical elements. The detector array is arranged at an oblique angle with respect to the z-axis. The array generates a detector signal in response to detecting a light beam, which has a z-focus in the interior of the eye. The set of line focus optical elements focuses the light beam to form a line focus on the detector array, and the set of nominal focus optical elements focuses the light beam to form a nominal focus on the detector array. The computer: generates an image using the detector signal; determines the position of the nominal focus on the line focus according to the image; and determines the z-location of the z-focus from the position of the nominal focus on the line focus.

Embodiments may include none, one, some, or all of the following features:

The oblique angle ranges from 3 to 60 degrees.

A change in the position of the nominal focus is proportional to a change in the z-location of the z-focus.

The image includes an oblong shape representing the line focus, and the nominal focus corresponds to the narrowest part of the oblong shape. In an embodiment, a first z-location of the z-focus corresponds to a first position of the nominal focus, and a second z-location of the z-focus corresponds to a second position of the nominal focus. The first z-location of the z-focus is different from the second z-location of the z-focus, and the first position of the nominal focus is different from the second position of the nominal focus. In an embodiment, the optimal z-focus corresponds to the narrowest part centered on the oblong shape.

The set of line focus optical elements comprise a cylindrical lens and a spherical lens, and the set of nominal focus optical elements comprise a fan out lens and the spherical lens.

The set of line focus optical elements comprise a toric lens and a focusing lens, and the set of line nominal focus optical elements comprise a collimating lens and the focusing lens.

The z-focus is located at a target. The computer may determine the z-location of the target according to the z-location of the z-focus. The ophthalmic system may further include a laser device that generates a laser beam, and the computer may instruct the laser device to direct the laser beam at the z-location of the z-focus in order to direct the laser beam at the target. The ophthalmic system may further include an SLO device that determines the xy-location of the target from an SLO image, where the z-axis defines an xy-plane orthogonal to the z-axis.

The computer determines whether the z-focus is the optimal z-focus from the z-location of the z-focus. If the z-focus is not the optimal z-focus, the computer adjusts the z-focus until the z-focus is the optimal z-focus. The computer may: determine whether the z-focus is the optimal z-focus by determining whether the image shows an oblong shape with a narrowest part centered on the oblong shape; and adjust the z-focus until the z-focus is the optimal z-focus by adjusting the z-focus until the image shows the oblong shape with the narrowest part centered on the oblong shape.

The z-axis defines an xy-plane orthogonal to the z-axis. The computer performs the following for multiple iterations to yield xy-plane images of the interior of the eye: adjust the z-location of the z-focus; and capture an xy-plane image of the interior of the eye at the z-location of the z-focus. The computer combines the xy-plane images to yield a three-dimensional image of the interior of the eye.

In certain embodiments, an ophthalmic surgical system includes a scanning laser ophthalmoscope (SLO)-anamorphic depth gauge (ADG) system, a laser device, and a computer. The SLO-ADG system directs an imaging beam towards a target in an eye. The eye has an eye axis that defines a z-axis, which in turn defines an xy-plane orthogonal to the z-axis. The SLO-ADG system determines the xyz-location of the target and includes an SLO device and an ADG device. The SLO device: detects the imaging beam reflected by the eye; generates an SLO image of the target in the eye; and determines the xy-location of the target from the SLO image. The ADG device: detects the imaging beam reflected by the eye; and determines the z-location of the target. The laser device directs a laser beam at the xyz-location of the target, and the computer instructs the laser device to direct the laser beam at the xyz-location of the target.

Embodiments may include none, one, some, or all of the following features:

The ADG device includes a detector array, a set of line focus optical elements, and a set of nominal focus optical elements. The detector array is arranged at an oblique angle with respect to the z-axis. The detector array generates a detector signal in response to detecting a light beam, which has a z-focus in the interior of the eye. The set of line focus optical elements focuses the light beam to form a line focus on the detector array, and the set of nominal focus optical elements focuses the light beam to form a nominal focus on the detector array. The computer: generates an image using the detector signal; determines a position of the nominal focus on the line focus according to the image; and determines the z-location of the z-focus from the position of the nominal focus on the line focus. In certain embodiments, the computer may determine the z-location of the target according to the z-location of the z-focus. A change in the position of the nominal focus may be proportional to a change in the z-location of the z-focus. The image may be an oblong shape representing the line focus, and the nominal focus may correspond to a narrowest part of the oblong shape.

The ophthalmic surgical system includes an xy-scanner that: receives the imaging beam from the SLO-ADG system and directs the imaging beam along an imaging beam path towards the xy-location of the target; and receives the laser beam from the laser device and directs the laser beam along a laser beam path aligned with the imaging beam path towards the xy-location of the target.

In certain embodiments, a measuring system includes an anamorphic depth gauge (ADG) device and a computer. The ADG device measures a z-location within a volume having a z-axis. The ADG device includes a detector array, a set of line focus optical elements, and a set of nominal focus optical elements. The detector array is arranged at an oblique angle with respect to the z-axis. The detector array generates a detector signal in response to detecting a light beam, which has a z-focus in the interior of the volume. The set of line focus optical elements focuses the light beam to form a line focus on the detector array, and the set of nominal focus optical elements focuses the light beam to form a nominal focus on the detector array. The computer: generates an image using the detector signal; determines a position of the nominal focus on the line focus according to the image; and determines the z-location of the z-focus from the position of the nominal focus on the line focus.

Embodiments may include none, one, some, or all of the following features:

The z-focus is located at a target. In an embodiment, the computer may determine the z-location of the target according to the z-location of the z-focus. The ophthalmic system may further include an SLO device that determines the xy-location of the target from an SLO image, where the z-axis defines an xy-plane orthogonal to the z-axis. In an embodiment, the ophthalmic system may further include a laser device that generates a laser beam, and the computer may instruct the laser device to direct the laser beam at the z-location of the z-focus and/or the xy-location of the target in order to direct the laser beam at the target.

DESCRIPTION OF EXAMPLE EMBODIMENTS

Figure 1:
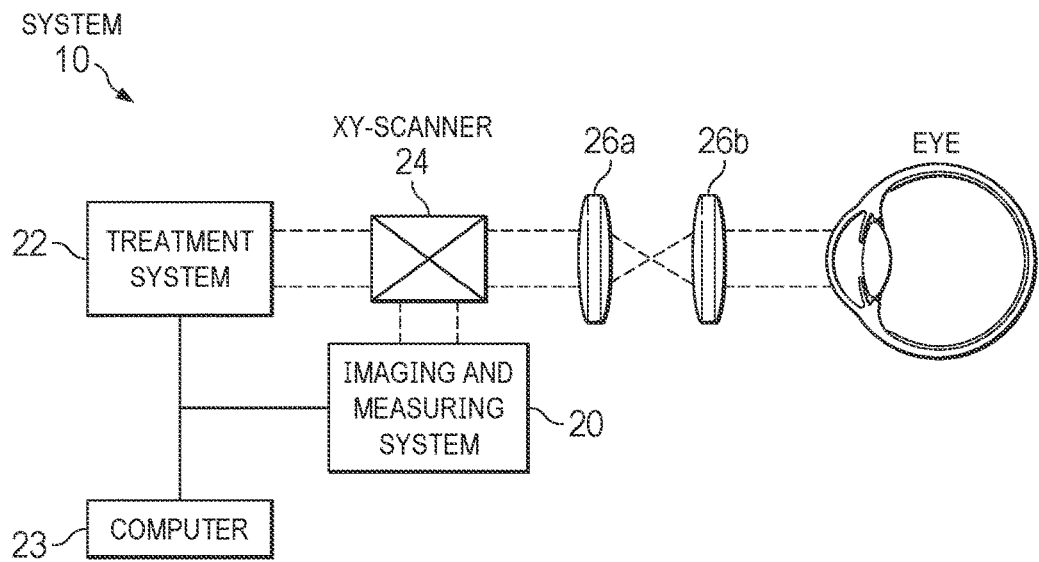
FIG. 1 illustrates an example of an ophthalmic laser surgical system for imaging and treating a target in an eye, according to certain embodiments.

Referring now to the description and drawings, example embodiments of the disclosed apparatuses, systems, and methods are shown in detail. The description and drawings are not intended to be exhaustive or otherwise limit the claims to the specific embodiments shown in the drawings and disclosed in the description. Although the drawings represent possible embodiments, the drawings are not necessarily to scale and certain features may be simplified, exaggerated, removed, or partially sectioned to better illustrate the embodiments.

Known laser surgical devices often fail to provide adequate imaging or depth measurement of a target in an eye. Accordingly, ophthalmic systems described here include an anamorphic depth gauge (ADG) device that can be used to focus an imaging device at a target or determine the depth of a target. The ADG device receives a light beam that is focused at a point in an eye. An arrangement of anamorphic optics of the ADG device modulates the light beam to yield a line focus with a nominal focus on tilted linear detector array. The position of the nominal focus on the line focus indicates the depth of the focus of the light beam in the eye. When the focus is optimal, the nominal focus is at a particular position of the line focus.

Embodiments of the ADG device have several applications within ophthalmic systems. For example, the ADG device may be used to adjust the depth of the focus of an imaging beam for an autofocusing system. As another example, the ADG device may be used to measure the location of a target relative to the focus of the imaging beam. In this example, a laser device can use the target location to aim a laser beam. As yet another example, the ADG device may be used to generate three-dimensional (3D) images.

Embodiments of the ADG device offer several advantages. For example, the ADG can measure the depth of a target, such as an eye floater, within a few hundred microns in a very short time. As another example, the ADG device is less expensive than an optical coherence tomography (OCT) depth gauge. As yet another example, the ADG device requires relatively little signal processing.

FIG. 1 illustrates an example of an ophthalmic laser surgical system 10 for imaging and treating a target in an eye, according to certain embodiments. In the example, the target may be a vitreous floater. The eye has an eye axis (e.g., visual or optical axis), which defines a z-axis. The z-axis defines an x-axis and a y-axis orthogonal to the z-axis, which define xy-planes. The x-, y-, and z-axes may, but need not be, positioned as in conventional coordinate systems of the eye. X-, y-, and z-locations and x-, y-, and z-directions are relative to the x-, y-, and z-axes, respectively.

As an overview of the illustrated example, system 10 includes an imaging system 20, a treatment system 22, a computer 23, an xy-scanner 24, and optical elements 26 (26a, 26b), coupled as shown. Computer 23 includes logic, a memory (which may store a program), and an interface (which may include a display).

As an overview of operation, imaging and measuring system 20 includes a scanning laser ophthalmoscope (SLO)-anamorphic depth gauge (ADG) system that directs an imaging beam towards a target in an eye. The SLO-ADG system includes an SLO device and an ADG device. The SLO device detects the imaging beam reflected by the eye, generates SLO images of the target in the eye, and determines an xy-location of the target from the SLO images. The ADG device detects the imaging beam reflected by the eye and determines a z-location of the target. Treatment system 22 includes a laser device that directs a laser beam at the xyz-location of the target. Xy-scanner 24 receives the imaging beam from imaging system 20 and directs the imaging beam along an imaging beam path towards the xy-location of the target. Xy-scanner 24 also receives the laser beam from the laser device and directs the laser beam along a laser beam path aligned with the imaging beam path towards the xy-location of the target. Computer 23 sends instructions to the SLO-ADG system and the laser device.

Turning to the components, an example of imaging system 20 is described in more detail with reference to FIG. 2. The laser device of treatment system 22 may comprise any suitable laser source that generates laser beams of any suitable wavelength, e.g., 100 to 2000 nanometers (nm). Examples of the laser device include a femtosecond laser or pulsed Nd:YAG laser. A dichroic mirror may couple the laser beam with the imaging beam.

Xy-scanner 24 scans treatment and imaging beams transversely in xy-directions. Examples of scanners include a galvo scanner (e.g., a pair of galvanometrically-actuated scanner mirrors that can be tilted about mutually perpendicular axes), an electro-optical scanner (e.g., an electro-optical crystal scanner) that can electro-optically steer the beam, or an acousto-optical scanner (e.g., an acousto-optical crystal scanner) that can acousto-optically steer the beam. XY-scanner 36 may include an afocal relay lens system that allows for the compensation of patient refractive error.

Optical elements 26 direct beams to and/or from the eye. In general, an optical element can act on (e.g., transmit, reflect, refract, diffract, collimate, condition, shape, focus, modulate, and/or otherwise act on) a laser beam. Examples of optical elements include a lens, prism, mirror, diffractive optical element (DOE), holographic optical element (HOE), and spatial light modulator (SLM). Lens 26b may move to compensate for refractive error.

Computer 23 controls components of system 10, such imaging system 20, treatment system 22, computer 23, xy-scanner 24, and optical elements 26. Computer 23 may be part of a component or separate from the component. For example, computer 23 may be a part of the SLO-ADG system to perform the operations of the system.

Figure 2:
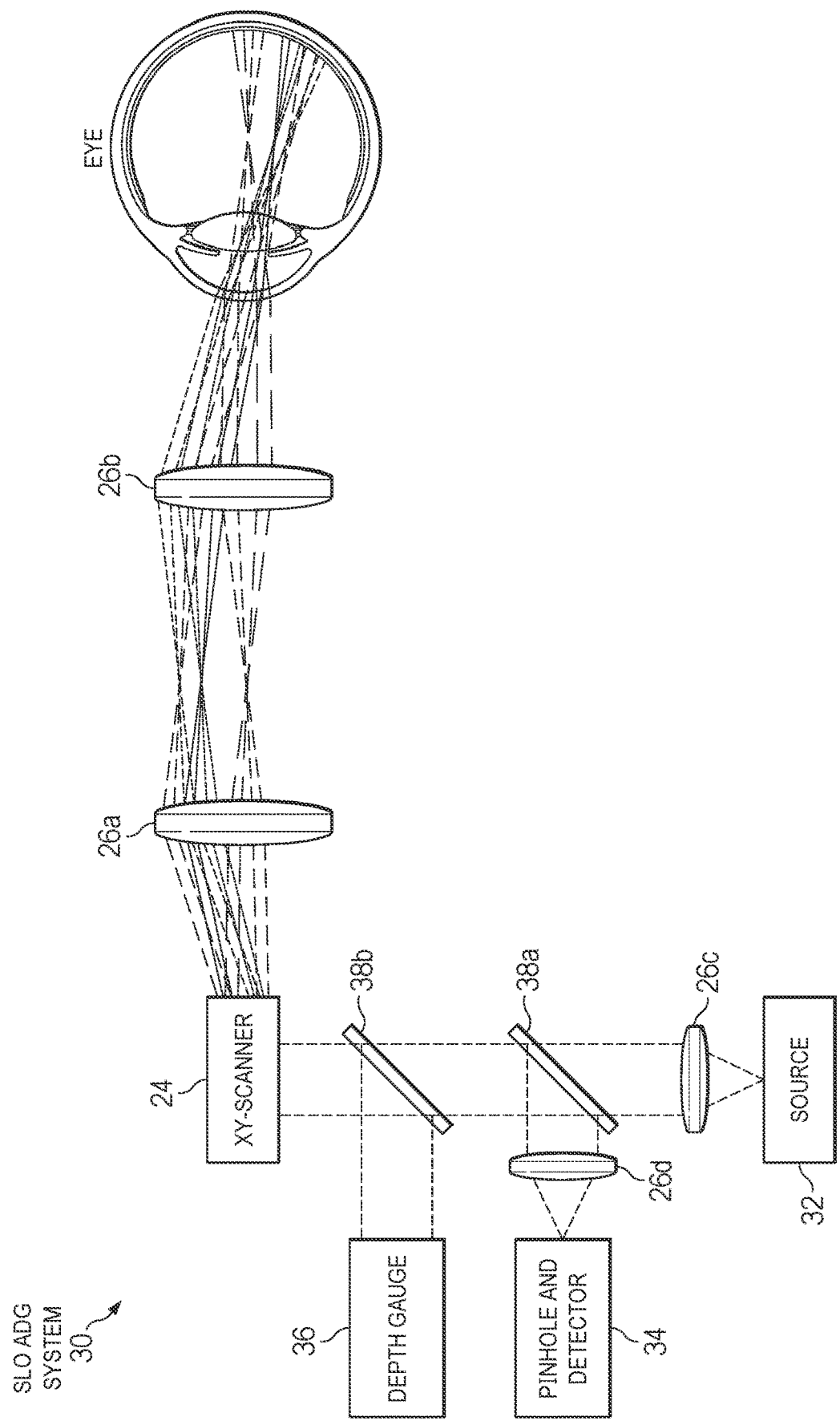
FIG. 2 illustrates an example of an SLO-ADG system that may be used in the system of FIG. 1, according to certain embodiments.

FIG. 2 illustrates an example of an SLO-ADG system 30 that may be used in system 10 of FIG. 1, according to certain embodiments. In the example, SLO-ADG system 30 includes a light source 32, a pinhole and detector 34, a depth gauge 36, beamsplitters 38 (38a, 38b), xy-scanner 24, and optical elements 26 (26c, 26c), coupled as shown. The SLO device of SLO-ADG system 30 may include light source 32, optical elements 26c, 26d, beamsplitter 38a, and pinhole and detector 34. The ADG device of SLO-ADG system 30 may include light source 32, beamsplitter 38b, and depth gauge 36. In certain embodiments, the SLO and ADG devices may share light source 32.

As an example of operation, light source 32 directs light through lens 26c towards xy-scanner 24. Xy-scanner 24 directs the light towards the eye and directs light reflected from the eye towards beamsplitters 38. Beamsplitters 38a, 38b direct the reflected light towards pinhole and detector 34 and depth gauge 36 respectively. Pinhole and detector 34 detect the light and generate SLO images from the light. Depth gauge 36 measures the z-location of features and/or a target.

Turning to the components, the SLO device generates SLO images of the interior of the eye. In general, the SLO device can provide higher field of view (FOV) imaging, which may facilitate detection of targets, such as floaters or other vitreous opacities, during treatment. For example, SLO images enhance the contrast between a floater (or floater shadow) and the retina, allowing for easier detection of floaters. The SLO device may use image processing to detect a target in an image.

In certain embodiments, ADG device 50 provides real-time depth information of a target. If a floater is too close to the retina, system 10 may warn the user of possible laser-induced retinal damage. ADG device 50 is described in more detail with reference to FIGS. 3 through 5. In the embodiments, computer 23 may output images via a display.

Figure 3:
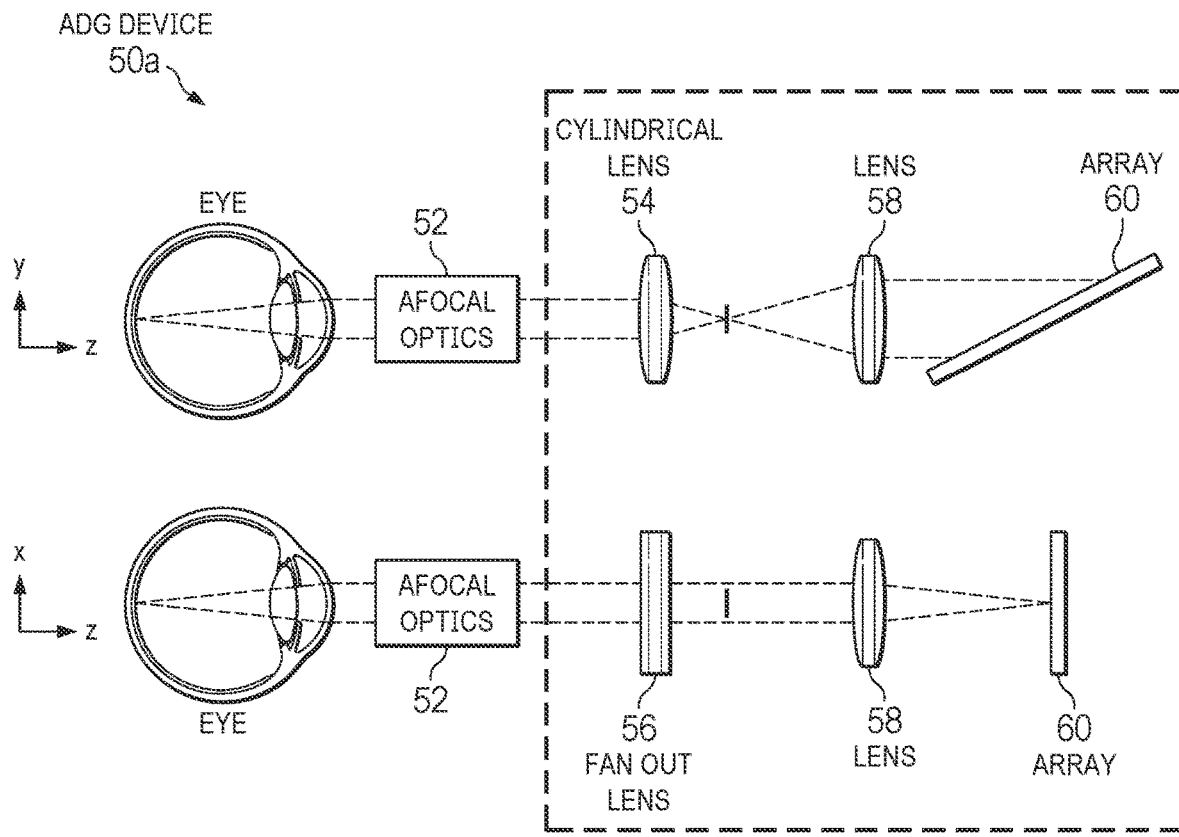
FIG. 3 illustrates an example of an ADG device that may be used in the SLO-ADG system of FIG. 2, according to certain embodiments.
Figure 4:
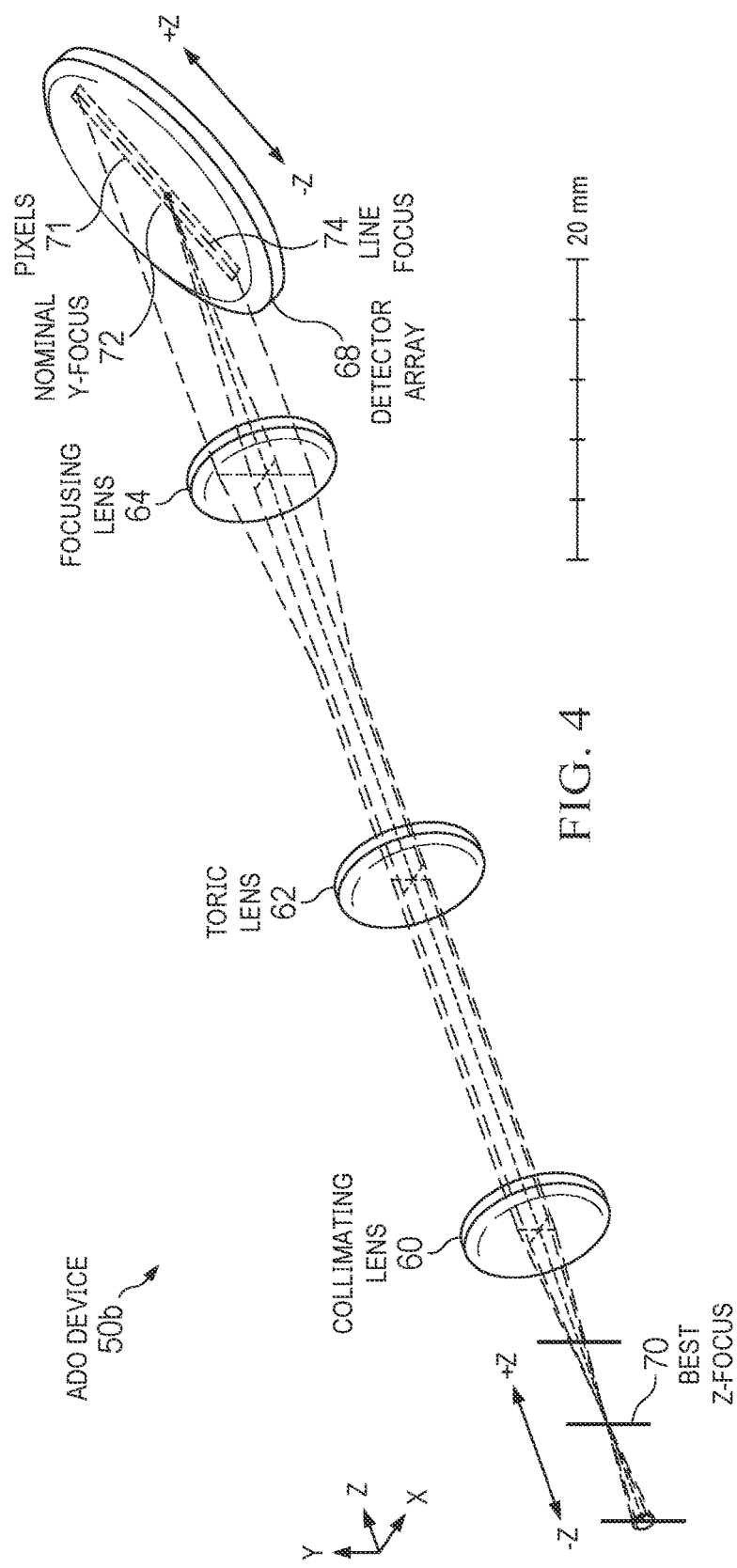
FIG. 4 illustrates another example of an ADG device that may be used in the SLO-ADG system of FIG. 2, according to certain embodiments.
Figure 5:
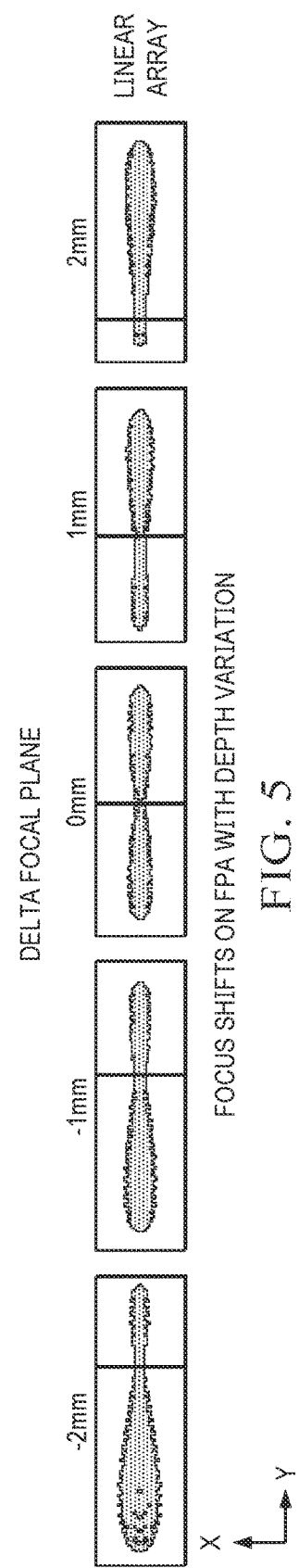
FIG. 5 illustrates examples of how different positions of the z-focus yield different detector array patterns.

FIGS. 3 through 5 describe examples of an ADG device 50 (50a, 50b) that may be used in system 10 of FIG. 1, according to certain embodiments. FIG. 3 illustrates an example of ADG device 50a, which includes afocal optics 52, a cylindrical lens 54, a fanout lens 56, a spherical lens 58, and a linear detector array 60. In the illustrated example, line focus optical elements include cylindrical lens 54 and spherical lens 58, and nominal focus optical elements include fan out lens 56 and spherical lens 58.

Detector array 60 is tilted about the x-axis at an oblique angle with respect to z-axis. The oblique angle may have any suitable value, e.g., an angle in the range of 3 to 60 degrees, such as 3 to 10, 10 to 20, 20 to 30, 30 to 40, 40 to 50, and/or 50 to 60 degrees. Detector array 60 may be any suitable size, e.g., 0.1 to 2 centimeters (cm) (such as 0.1 to 0.5, 0.5 to 1, 1 to 1.5, and/or 1.5 to 2 cm) in width and 0.5 to 10 cm (such as 0.5 to 1, 1 to 2, 2 to 3, 3 to 5, 5 to 7, and/or 7 to 10 cm) in length.

Afocal optics 52 receive a light beam reflected from the interior of an eye, such that the focal point of the beam is within the eye. In the yz-plane, cylindrical lens 54 and spherical lens 58 form a Keplerian telescope, where cylindrical lens 54 focuses the beam and spherical lens 58 collimates the beam to yield a line focus at linear detector array 60. In the xz-plane, fanout lens 56 and spherical lens 58 focus the beam onto linear detector array 60.

FIG. 4 illustrates an example of ADG device 50b, which includes a collimating lens 60, a toric lens 62, a focusing lens 64, and a linear detector array 68 with pixels 71 arranged in a linear manner. In the example, line focus optical elements include toric lens 62 and focusing lens 64, and nominal focus optical elements include collimating lens 60 and focusing lens 64.

In the example, linear detector array 68 is tilted about the x-axis at an oblique angle relative to the z-axis. The oblique angle may have any suitable value, e.g., an angle in the range as described above with reference to detector array 60. In the yz-plane, toric lens 62 fans out the beam along the y-axis, and focusing lens 64 collimates the beam in the y-axis while focusing the beam along the x-axis to yield a line focus 74 on detector array 68. In the xz-plane, collimating lens 60 and focusing lens 64 focus the beam onto the linear detector array 68 to yield a nominal y-focus 72 on detector array 68. Nominal y-focus 72 is the nominal position along the y-axis of the detector that corresponds to the nominal focal position. An optimal z-focus 70 yields a nominal y-focus 72 that is centered relative to line focus 74. Optimal z-focus 70 indicates where an object would be in focus, i.e., have the clearest image.

FIG. 5 illustrates examples of how different positions of z-focus 70 yield different patterns on detector array 68 that indicate different positions of nominal y-focus 72. In the example, linear detector array 68 detects an oblong shape representing the line focus, and nominal y-focus 72 is the narrowest part of the shape. The patterns show that nominal y-focus 72 moves along the y-axis as a function of defocus, or change in z-focus 70. For example, at the optimal z-focus 70, nominal y-focus 72 is centered relative to line focus 74. At −2 millimeters (mm) away from optimal z-focus 70, nominal y-focus 72 moves in one direction, and at +2 mm away from optimal z-focus 70, nominal y-focus 72 moves to in the other direction.

The relationship describing the nominal y-focus that results from a particular z-focus may depend on the specific arrangement of components. The relationship may be determined (e.g., during calibration) by shifting the z-focus, recording the resulting nominal y-focus, and determining the relationship between the z-focus and the resulting nominal y-focus using, e.g., regression analysis.

As the examples show, as input z-focus 70 moves in the z-direction (FIG. 4), nominal y-focus 72 moves across linear detector array 68 such that different z-locations of the z-focus 70 correspond to different positions of nominal y-focus 72. The amount of movement of nominal y-focus 72 is proportional to amount of movement of z-focus 70, i.e., the change in the position of nominal y-focus 72 is proportional to the change in the z-location of z-focus 70. Accordingly, given the location of the nominal y-focus 72, as indicated by the patterns detected by detector array 68, the z-location of z-focus 70 may be determined.

Embodiments of ADG device 50 have several applications within ophthalmic systems. For example, the ADG device may be used to measure the z-location of a target, and a laser device can use the z-location to aim a laser beam at the target. This is described in more detail with reference to FIG. 6.

As another example, the ADG device may be used to adjust the depth of the focus of an autofocusing system. In certain embodiments, a computer determines whether the z-focus is optimal. For example, the computer may determine whether an image shows an oblong shape with the narrowest part centered in the middle of the shape. If the z-focus is not optimal, a computer adjusts the z-focus until the z-focus is optimal. For example, the computer may adjust the z-focus until the image shows the oblong shape with the narrowest part centered in the shape.

As another example, the ADG device may be used to generate three-dimensional (3D) images. In certain embodiments, the z-focus may be adjusted to different z-locations to capture xy-plane images at the different z-locations. The xy-plane images may be combined to generate a 3D image, e.g., a 3D image of a floater.

Figure 6:
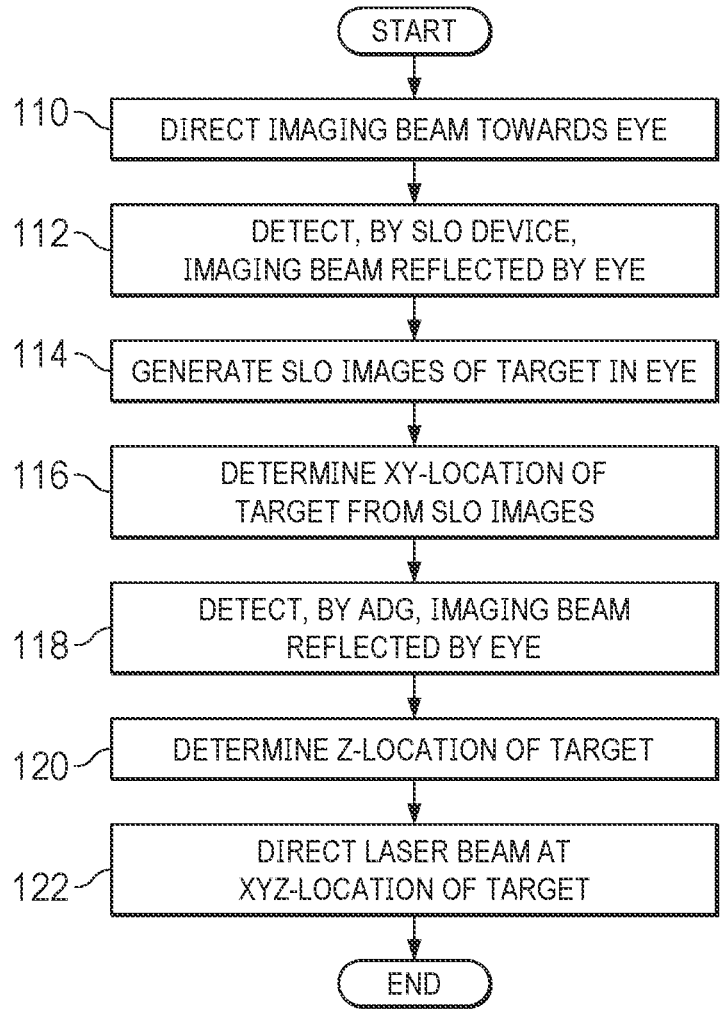
FIG. 6 illustrates an example of a method for treating a target in an eye that may be performed by the system of FIG. 1, according to certain embodiments.

FIG. 6 illustrates an example of a method for imaging and treating a target (e.g., an eye floater) in an eye that may be performed by system 10 of FIG. 1, according to certain embodiments. The method starts at step 110, where the SLO-ADG device directs an imaging beam towards the target in the eye. The SLO device detects the imaging beam reflected by the eye at step 112. The SLO device generates an SLO image of the target at step 114 and determines the xy-location of the target from the SLO image at step 116. For example, the SLO device may use image processing to determine the xy-location of the target from the image.

The ADG device detects the imaging beam reflected by the eye at step 118 and determines the z-location of the target at step 120. For example, the ADG device generates an image from the imaging beam that indicates the position of the nominal focus and then determines the z-location of the z-focus from the position of the nominal focus. If the target is at the z-focus, then the z-location of the target is the same as that for the z-focus. The laser device directs a laser beam at the xy- and z-location of the target at step 122.

A component (such as the control computer) of the systems and apparatuses disclosed herein may include an interface, logic, and/or memory, any of which may include computer hardware and/or software. An interface can receive input to the component and/or send output from the component, and is typically used to exchange information between, e.g., software, hardware, peripheral devices, users, and combinations of these. A user interface is a type of interface that a user can utilize to communicate with (e.g., send input to and/or receive output from) a computer. Examples of user interfaces include a display, Graphical User Interface (GUI), touchscreen, keyboard, mouse, gesture sensor, microphone, and speakers.

Logic can perform operations of the component. Logic may include one or more electronic devices that process data, e.g., execute instructions to generate output from input. Examples of such an electronic device include a computer, processor, microprocessor (e.g., a Central Processing Unit (CPU)), and computer chip. Logic may include computer software that encodes instructions capable of being executed by an electronic device to perform operations. Examples of computer software include a computer program, application, and operating system.

A memory can store information and may comprise tangible, computer-readable, and/or computer-executable storage medium. Examples of memory include computer memory (e.g., Random Access Memory (RAM) or Read Only Memory (ROM)), mass storage media (e.g., a hard disk), removable storage media (e.g., a Compact Disk (CD) or Digital Video or Versatile Disk (DVD)), database, network storage (e.g., a server), and/or other computer-readable media. Particular embodiments may be directed to memory encoded with computer software.

Although this disclosure has been described in terms of certain embodiments, modifications (such as changes, substitutions, additions, omissions, and/or other modifications) of the embodiments will be apparent to those skilled in the art. Accordingly, modifications may be made to the embodiments without departing from the scope of the invention. For example, modifications may be made to the systems and apparatuses disclosed herein. The components of the systems and apparatuses may be integrated or separated, or the operations of the systems and apparatuses may be performed by more, fewer, or other components, as apparent to those skilled in the art. As another example, modifications may be made to the methods disclosed herein. The methods may include more, fewer, or other steps, and the steps may be performed in any suitable order, as apparent to those skilled in the art.

To aid the Patent Office and readers in interpreting the claims, Applicants note that they do not intend any of the claims or claim elements to invoke 35 U.S.C. § 112(f), unless the words "means for" or "step for" are explicitly used in the particular claim. Use of any other term (e.g., "mechanism," "module," "device," "unit," "component," "element," "member," "apparatus," "machine," "system," "processor," or "controller") within a claim is understood by the applicants to refer to structures known to those skilled in the relevant art and is not intended to invoke 35 U.S.C. § 112(f).

What is claimed:

1. An ophthalmic system comprising:
   an anamorphic depth gauge (ADG) device configured to measure a z-location in an interior of an eye, the eye having an eye axis that defines a z-axis, the ADG device comprising:
   a detector array arranged at an oblique angle with respect to the z-axis, the detector array configured to generate a detector signal in response to detecting a light beam, the light beam having a z-focus in the interior of the eye;

a set of line focus optical elements configured to focus the light beam to form a line focus on the detector array; and
a set of nominal focus optical elements configured to focus the light beam to form a nominal focus on the detector array; and
a computer configured to:
generate an image using the detector signal;
determine a position of the nominal focus on the line focus according to the image; and
determine the z-location of the z-focus from the position of the nominal focus on the line focus.

2. The ophthalmic system of claim 1, the oblique angle ranging from 3 to 60 degrees.

3. The ophthalmic system of claim 1, a change in the position of the nominal focus proportional to a change in the z-location of the z-focus.

4. The ophthalmic system of claim 1:
the image comprising an oblong shape representing the line focus; and
the nominal focus corresponding to a narrowest part of the oblong shape.

5. The ophthalmic system of claim 4:
a first z-location of the z-focus corresponding to a first position of the nominal focus; and
a second z-location of the z-focus corresponding to a second position of the nominal focus, the first z-location of the z-focus different from the second z-location of the z-focus, and the first position of the nominal focus different from the second position of the nominal focus.

6. The ophthalmic system of claim 4, an optimal z-focus corresponding to the narrowest part centered on the oblong shape.

7. The ophthalmic system of claim 1:
the set of line focus optical elements comprise a cylindrical lens and a spherical lens; and
the set of nominal focus optical elements comprise a fan out lens and the spherical lens.

8. The ophthalmic system of claim 1:
the set of line focus optical elements comprise a toric lens and a focusing lens; and
the set of line nominal focus optical elements comprise a collimating lens and the focusing lens.

9. The ophthalmic system of claim 1, the z-focus located at a target.

10. The ophthalmic system of claim 9, the computer configured to determine a z-location of the target according to the z-location of the z-focus.

11. The ophthalmic system of claim 9:
further comprising a laser device configured to generate a laser beam; and
the computer configured to instruct the laser device to direct the laser beam at the z-location of the z-focus in order to direct the laser beam at the target.

12. The ophthalmic system of claim 9, the z-axis defining an xy-plane orthogonal to the z-axis, further comprising an SLO device configured to determine an xy-location of the target from an SLO image.

13. The ophthalmic system of claim 1, the computer configured to:
determine from the z-location of the z-focus whether the z-focus is an optimal z-focus; and
if the z-focus is not the optimal z-focus, adjust the z-focus until the z-focus is the optimal z-focus.

14. The ophthalmic system of claim 13, the computer configured to:
determine whether the z-focus is the optimal z-focus by determining whether the image shows an oblong shape with a narrowest part centered on the oblong shape; and
adjust the z-focus until the z-focus is the optimal z-focus by adjusting the z-focus until the image shows the oblong shape with the narrowest part centered on the oblong shape.

15. The ophthalmic system of claim 1, the z-axis defining an xy-plane orthogonal to the z-axis, the computer configured to:
perform the following for a plurality of iterations to yield a plurality of xy-plane images of the interior of the eye:
adjust the z-location of the z-focus;
capture an xy-plane image of the interior of the eye at the z-location of the z-focus; and
combine the plurality of xy-plane images to yield a three-dimensional image of the interior of the eye.

16. An ophthalmic surgical system comprising:
a scanning laser ophthalmoscope (SLO)-anamorphic depth gauge (ADG) system configured to direct an imaging beam towards a target in an eye, the eye having an eye axis that defines a z-axis, the z-axis defining an xy-plane orthogonal to the z-axis, the SLO-ADG system configured to determine an xyz-location of the target, the SLO-ADG system comprising:
an SLO device configured to:
detect the imaging beam reflected by the eye;
generate an SLO image of the target in the eye; and
determine an xy-location of the target from the SLO image;
an ADG device configured to:
detect the imaging beam reflected by the eye; and
determine a z-location of the target;
a laser device configured to direct a laser beam at the xyz-location of the target; and
a computer configured to instruct the laser device to direct the laser beam at the xyz-location of the target.

17. The ophthalmic surgical system of claim 16:
the ADG device comprising:
a detector array arranged at an oblique angle with respect to the z-axis, the detector array configured to generate a detector signal in response to detecting a light beam, the light beam having a z-focus in the interior of the eye;
a set of line focus optical elements configured to focus the light beam to form a line focus on the detector array; and
a set of nominal focus optical elements configured to focus the light beam to form a nominal focus on the detector array; and
the computer configured to:
generate an image using the detector signal;
determine a position of the nominal focus on the line focus according to the image; and
determine the z-location of the z-focus from the position of the nominal focus on the line focus.

18. The ophthalmic system of claim 17, the computer configured to determine a z-location of the target according to the z-location of the z-focus.

19. The ophthalmic system of claim 17, a change in the position of the nominal focus proportional to a change in the z-location of the z-focus.

20. The ophthalmic system of claim 17:
the image comprising an oblong shape representing the line focus; and
the nominal focus corresponding to a narrowest part of the oblong shape.

21. The ophthalmic surgical system of claim 16, further comprising an xy-scanner configured to:
receive the imaging beam from the SLO-ADG system and direct the imaging beam along an imaging beam path towards the xy-location of the target; and
receive the laser beam from the laser device and direct the laser beam along a laser beam path aligned with the imaging beam path towards the xy-location of the target.

* * * * *